(12) United States Patent
Yang

(10) Patent No.: US 12,003,860 B2
(45) Date of Patent: Jun. 4, 2024

(54) IMAGE PROCESSING METHOD AND ELECTRONIC DEVICE

(71) Applicant: VIVO MOBILE COMMUNICATION CO., LTD., Guangdong (CN)

(72) Inventor: Zhuojian Yang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 223 days.

(21) Appl. No.: 17/690,859

(22) Filed: Mar. 9, 2022

(65) Prior Publication Data

US 2022/0201181 A1 Jun. 23, 2022

Related U.S. Application Data

(63) Continuation of application No. PCT/CN2020/116907, filed on Sep. 22, 2020.

(30) Foreign Application Priority Data

Sep. 27, 2019 (CN) .......................... 201910921078.X

(51) Int. Cl.
  *H04N 23/71* (2023.01)
  *H04N 23/13* (2023.01)
  *H04N 23/741* (2023.01)

(52) U.S. Cl.
  CPC ............. *H04N 23/71* (2023.01); *H04N 23/13* (2023.01); *H04N 23/741* (2023.01)

(58) Field of Classification Search
  None
  See application file for complete search history.

(56) References Cited

U.S. PATENT DOCUMENTS

| 9,894,298 B1 | 2/2018 | Solh |
| 2014/0139642 A1* | 5/2014 | Ni .......................... H04N 23/13 382/162 |

(Continued)

FOREIGN PATENT DOCUMENTS

| CN | 103986874 A | 8/2014 |
| CN | 106488107 A | 3/2017 |

(Continued)

OTHER PUBLICATIONS

The First Office Action of Priority Application No. CN 201910921078.X issued by the Chinese Patent Office on Oct. 10, 2020.

(Continued)

*Primary Examiner* — Twyler L Haskins
*Assistant Examiner* — Wesley J Chiu
(74) *Attorney, Agent, or Firm* — IP & T GROUP LLP

(57) ABSTRACT

An image processing method includes: obtaining a first image photographed by each of N1 first cameras in the M1 first cameras and a second image photographed by each of N2 second cameras in the M2 second cameras; obtaining luminance values of at least a part of pixels in the first image and luminance values of at least a part of pixels in the second image for each first image and each second image; and increasing luminance of a target image based on obtained luminance values, and using, as a photographed image of the under-display camera assembly, a target image obtained after the luminance is increased. M1, N1, M2, and N2 are all integers greater than or equal to 1.

16 Claims, 6 Drawing Sheets

(56) References Cited

U.S. PATENT DOCUMENTS

| | | | | |
|---|---|---|---|---|
| 2016/0269694 A1* | 9/2016 | Masuda | ................ | H04N 23/16 |
| 2017/0124942 A1* | 5/2017 | Evans, V | ........... | G02B 27/0093 |
| 2017/0201692 A1* | 7/2017 | Wu | ....................... | H04N 23/70 |
| 2019/0043220 A1 | 2/2019 | Kumar et al. | | |
| 2019/0208133 A1 | 7/2019 | Ho et al. | | |
| 2019/0333186 A1 | 10/2019 | Chen et al. | | |
| 2022/0201223 A1* | 6/2022 | Yang | ..................... | H04N 23/76 |
| 2024/0080556 A1* | 3/2024 | Shabtay | ................ | H04N 23/13 |

FOREIGN PATENT DOCUMENTS

| | | |
|---|---|---|
| CN | 108257514 A | 7/2018 |
| CN | 109068043 A | 12/2018 |
| CN | 109587396 A | 4/2019 |
| CN | 109840475 A | 6/2019 |
| CN | 209170442 U | 7/2019 |
| CN | 209328043 U | 8/2019 |
| CN | 110769151 A | 2/2020 |
| CN | 110971805 A | 4/2020 |
| EP | 2627073 A1 | 8/2013 |
| WO | 2018119787 A1 | 7/2018 |

OTHER PUBLICATIONS

The Second Office Action of Priority Application No. CN 201910921078.X issued by the Chinese Patent Office on Apr. 21, 2021.

International Search Report and Written Opinion of International Application No. PCT/CN2020/116907 issued by the Chinese Patent Office on Dec. 9, 2020.

Extended European Search Report on the European Patent Application No. 20867460.6 issued by the European Patent Office on Oct. 20, 2022.

\* cited by examiner

Color camera 1

Color camera 2

Monochrome camera 1

Monochrome camera 2

Color camera 1

Color camera 2

Monochrome camera 1

Monochrome camera 2

IMAGE PROCESSING METHOD AND ELECTRONIC DEVICE

CROSS-REFERENCE TO RELATED APPLICATION

This application is a Bypass Continuation Application of PCT/CN2020/116907, filed on Sep. 22, 2020, which claims priority to Chinese Patent Application No. 201910921078.X, filed on Sep. 27, 2019, which are incorporated herein by reference in their entirety.

TECHNICAL FIELD

This application relates to the data processing field, and in particular, to an image processing method and apparatus, an electronic device, and a medium.

BACKGROUND

With rapid development of mobile intelligent electronic device technologies, users have a higher requirement on mobile intelligent electronic devices. All mobile phone manufacturers try to increase a screen-to-body ratio of the electronic device, to improve user experience. However, because a lens of a front camera needs to have a specific transmittance, a black block is formed between a display screen and an area of the camera lens, and a picture cannot be displayed, affecting a user experience effect.

SUMMARY

This application provides an image processing method and apparatus, an electronic device, and a medium.

A first aspect of this application provides an image processing method, applied to an electronic device. The electronic device includes an under-display camera assembly, the under-display camera assembly includes M1 first cameras and M2 second cameras, and the method includes:

obtaining a first image photographed by each of N1 first cameras in the M1 first cameras and a second image photographed by each of N2 second cameras in the M2 second cameras;

obtaining luminance values of at least a part of pixels in the first image and luminance values of at least a part of pixels in the second image for each first image and each second image; and increasing luminance of a target image based on obtained luminance values, and using, as a photographed image of the under-display camera assembly, a target image obtained after the luminance is increased, where the target image is a first image photographed by one of the N1 first cameras, where M1, N1, M2, and N2 are all integers greater than or equal to 1, N1 is less than or equal to M1, and N2 is less than or equal to M2.

According to a second aspect, this application provides an image processing apparatus, applied to an electronic device. The electronic device includes an under-display camera assembly, the under-display camera assembly includes M1 first cameras and M2 second cameras, and the image processing apparatus includes:

an image obtaining module, configured to obtain a first image photographed by each of N1 first cameras in the M1 first cameras and a second image photographed by each of N2 second cameras in the M2 second cameras;

a luminance value obtaining module, configured to obtain luminance values of at least a part of pixels in the first image and luminance values of at least a part of pixels in the second image for each first image and each second image; and a luminance increasing module, configured to increase luminance of a target image based on obtained luminance values, and using, as a photographed image of the under-display camera assembly, a target image obtained after the luminance is increased, where the target image is a first image photographed by one of the N1 first cameras; and M1, N1, M2, and N2 are all integers greater than or equal to 1, N1 is less than or equal to M1, and N2 is less than or equal to M2.

According to a third aspect, this application further provides an electronic device, including:

an under-display camera assembly, where the under-display camera assembly includes M1 first cameras and M2 second cameras; and an image processing apparatus, configured to: obtain a first image photographed by each of N1 first cameras in the M1 first cameras and a second image photographed by each of N2 second cameras in the M2 second cameras; obtain luminance values of at least a part of pixels in the first image and luminance values of at least a part of pixels in the second image for each first image and each second image; and increase luminance of a target image based on obtained luminance values, and use, as a photographed image of the under-display camera assembly, a target image obtained after the luminance is increased, where the target image is a first image photographed by one of the N1 first cameras; and M1, N1, M2, and N2 are all integers greater than or equal to 1, N1 is less than or equal to M1, and N2 is less than or equal to M2.

According to a fourth aspect, this application further provides an electronic device. The electronic device includes a processor, a memory, and a computer program that is stored in the memory and that can be run on the processor, and when the computer program is executed by the processor, the image processing method in the first aspect of this application is implemented.

According to a fifth aspect, this application further provides a non-transitory computer-readable storage medium, where the non-transitory computer-readable storage medium stores a computer program instruction, and when the computer program instruction is executed by a processor, the image processing method in the first aspect of this application is implemented.

BRIEF DESCRIPTION OF DRAWINGS

This application can be better understood from the following description of specific implementations of this application with reference to the accompanying drawings, and the same or similar reference numerals indicate the same or similar features.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

Currently, by digging a hole in a display screen or a backlight area, for example, an in-display waterdrop screen, a screen-to-body ratio of a mobile phone can be increased to a certain extent. However, the user still sees a black spot of the camera after digging a hole from the front, and full-screen display is not fully implemented.

If the camera is placed below the display screen, full-screen display can be implemented. However, because the display screen has only a specified light transmittance, luminance of an image photographed by the camera is very low.

Figure 1:
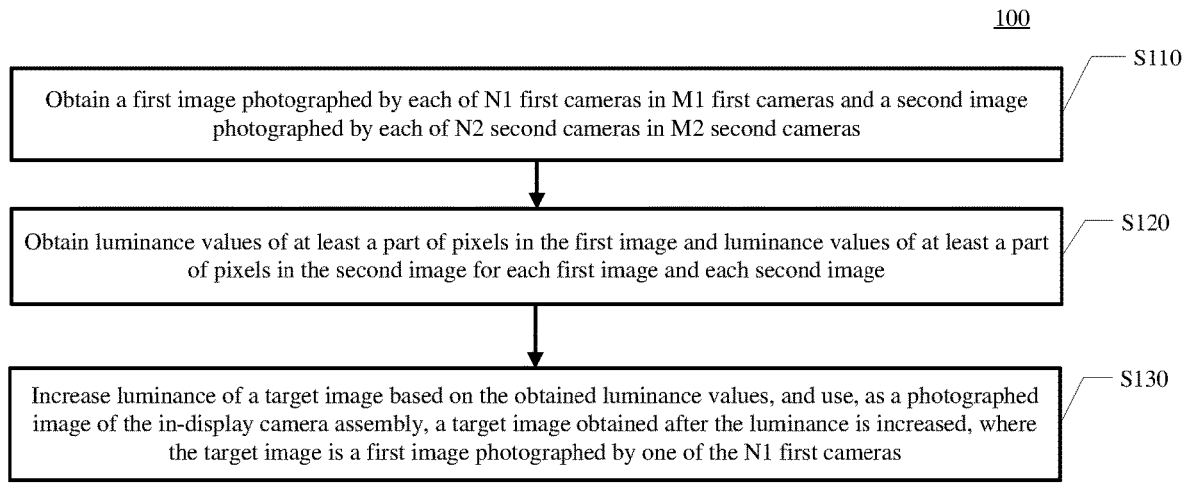
FIG. 1 is a schematic flowchart of an embodiment of the image processing method provided in the first aspect of this application.
Figure 2:
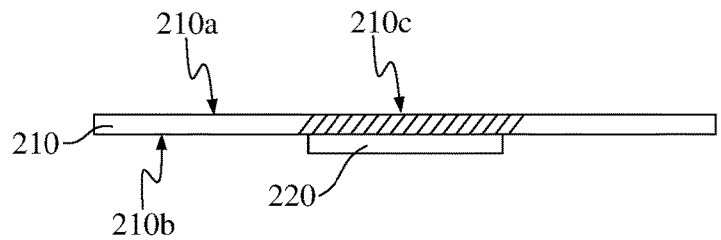
FIG. 2 is a front view of an exemplary electronic device to which the image processing method in the first aspect of this application can be applied.

FIG. 1 is a schematic flowchart of an embodiment of an image processing method 100 applied to an electronic device provided in the first aspect of this application. As shown in FIG. 2, an electronic device 200 to which the image processing method 100 provided in this application is applied includes:

a display panel 210, having a first surface 210*a* and a second surface 210*b* that are opposite to each other, where the first surface 210*a* is a display surface of a display panel 210 and the display panel 210 includes a light-transmitting area 210*c*; and an under-display camera assembly 220, disposed on the second surface 210*b* of the display panel 210 and corresponding to a position of the light-transmitting area 210*c*, where the under-display camera assembly 220 includes M1 first cameras and M2 second cameras, and both M1 and M2 are integers greater than or equal to 1.

The display panel 210 of the light-transmitting area 210*c* may be made of a light-transmitting material such as glass or polyimide (PI).

In this embodiment of this application, the electronic device includes but is not limited to a mobile phone, a tablet computer, a notebook computer, a palmtop computer, an in-vehicle terminal, a wearable device, and the like.

In this embodiment of this application, the M1 first cameras and the M2 second cameras in the under-display camera assembly 220 may be arranged according to a preset rule. For example, all cameras of the under-display camera assembly 220 may be arranged along a preset circular arc track, arranged along a preset circular track, or arranged in arrays.

Figure 3:
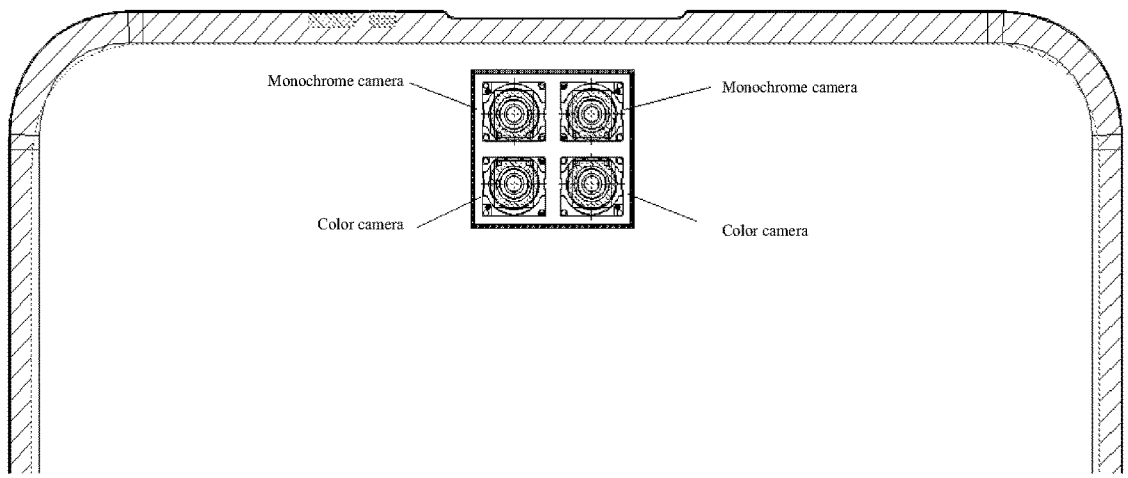
FIG. 3 is an example top view of an under-display camera assembly including two color cameras and two monochrome cameras in an exemplary electronic device.

In some embodiments, the first camera is a color camera, and the second camera is a monochrome camera. In an example, the under-display camera assembly 220 includes two monochrome cameras and two color cameras, and the four cameras are arranged in arrays. FIG. 3 shows a top view of the four cameras.

Arrangement positions of the first camera and the second camera are not specifically limited in this embodiment of this application. For example, in FIG. 3, one monochrome camera and one color camera may be disposed in a first row, and one monochrome camera and one color camera are also disposed in a second row.

Figure 4:
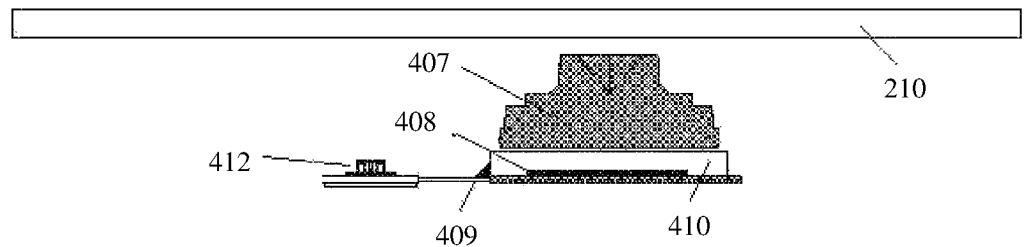
FIG. 4 is a side view of an example of a color camera in an exemplary electronic device.
Figure 5:
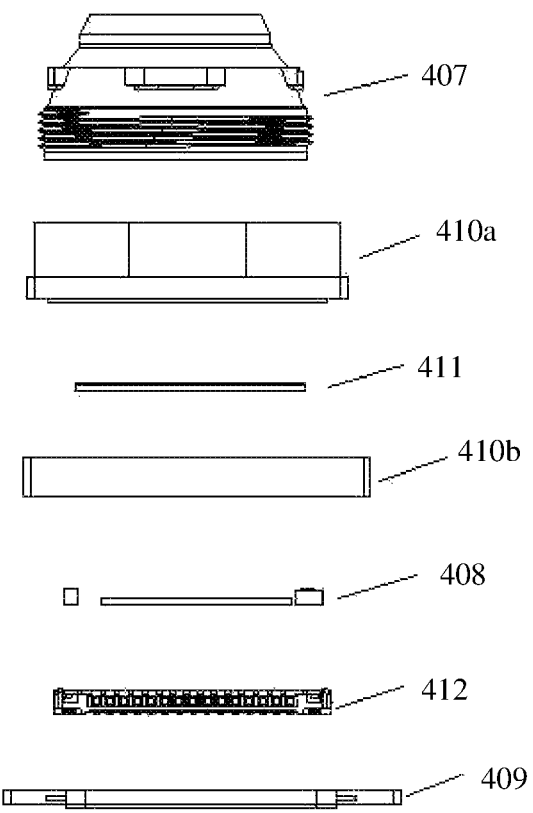
FIG. 5 is an exploded view of the color camera in FIG. 4.

In some embodiments of this application, structures of color cameras in the under-display camera assembly 220 are the same. FIG. 4 and FIG. 5 show a side view and an exploded view of the color camera. As shown in FIG. 4, the color camera includes a lens 407, a photosensitive chip 408, a circuit board 409 connected to the photosensitive chip 408, a lens holder 410, and a filter assembly 411. In an example, the circuit board 409 may be a flexible printed circuit (FPC). The lens 407 is a light concentration lens.

Referring to FIG. 4, the lens holder 410 is disposed on the circuit board 409. The lens 407 and the filter assembly 411 are disposed on the lens holder 410. Referring to FIG. 5, the lens holder 410 includes a first mounting portion 410*a* and a second mounting portion 410*b*. The first mounting portion 410*a* is configured to mount the lens 407. In some embodiments, the lens 407 may be connected to the first mounting portion 410*a* by using a thread. A plurality of lenses may be mounted in the lens 407. The second mounting portion 410*b* is configured to mount the filter assembly 411. The filter assembly 411 is disposed in a cavity of the lens holder 410.

Referring to FIG. 4, the lens 407 is disposed opposite to the photosensitive chip 408, and the photosensitive chip 408 is disposed on the circuit board 409, and is electrically connected to the circuit board 409. Referring to FIG. 5, the filter assembly 411 is located between the lens 407 and the photosensitive chip 408, and is configured to implement a filter function in a photographing process.

In this embodiment of this application, the color camera further includes a connector 412. The connector 412 is disposed on the circuit board 409 and is electrically connected to the circuit board 409. The connector 412 is configured to connect to a device to perform electrical energy and information transmission for the color camera.

Figure 6:
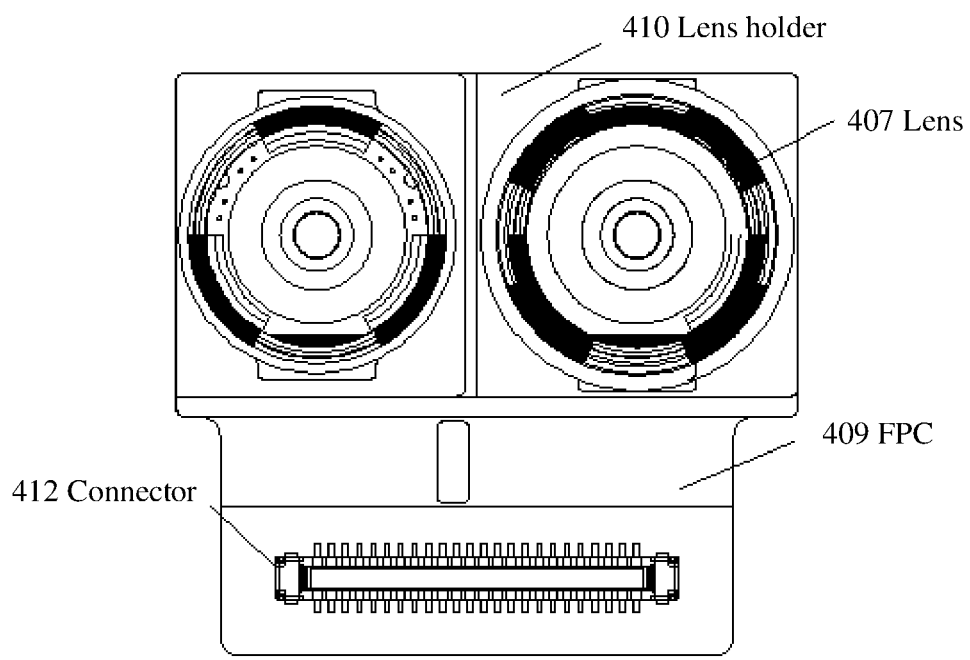
FIG. 6 is an example top view of two color cameras includes in an exemplary electronic device.
Figure 7:
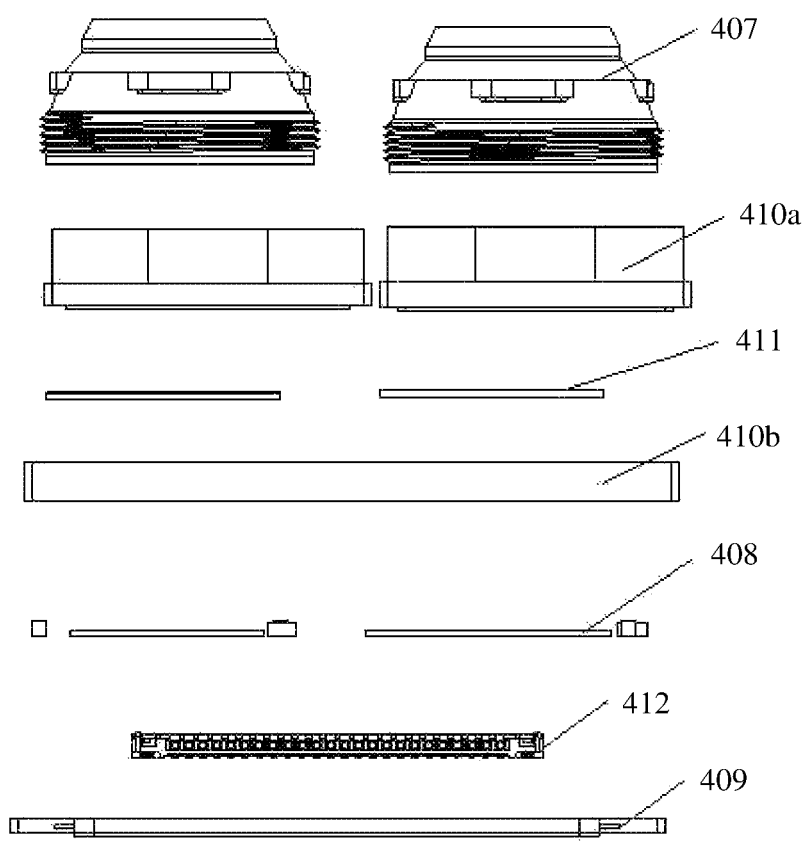
FIG. 7 is an exploded view of the two color cameras in FIG. 6.

In some embodiments of this application, to save internal space of the electronic device, two color cameras in the under-display camera assembly 220 may share the circuit board 409 and the connector 412. FIG. 6 and FIG. 7 show a top view and an exploded view of the two color cameras that share the circuit board 409 and the connector 412.

In this embodiment of this application, a structure of the monochrome camera is similar to that of the color camera, and details are not described herein again. A difference between the color camera and the monochrome camera lies in that a surface of a photosensitive chip in the color camera has a color filter, and a photosensitive chip in the monochrome camera is a monochrome filter. Because the monochrome filter of the photosensitive chip of the monochrome camera has no color, light can enter completely regardless of color, with a greater amount of light. Therefore, an image photographed by the monochrome camera is brighter than an image photographed by the color camera, and detail information may be better retained.

To save internal space of the electronic device, the two monochrome cameras of the under-display camera assembly 220 may also share the circuit board 409 and the connector 412.

In this embodiment of this application, the under-display camera assembly 220 may be disposed on the second surface 210b of the display panel 210, and full-screen display of the electronic device can be implemented without digging a hole in a display screen or a backlight area. In a case that the electronic device implements full-screen display, the light-transmitting area 210c of the display panel 210 also needs to have a display function, and therefore the light-transmitting 210c has only a specific light transmittance. Therefore, to ensure that an image photographed by the under-display camera assembly 220 below the display panel 210 has relatively high luminance, the image processing method 100 shown in FIG. 1 needs to be used.

Referring to FIG. 1, the image processing method 100 provided in this application includes S110 to S130.

S110: Obtain a first image photographed by each of N1 first cameras in the M1 first cameras and a second image photographed by each of N2 second cameras in the M2 second cameras.

S120: Obtain luminance values of at least a part of pixels in the first image and luminance values of at least a part of pixels in the second image for each first image and each second image.

S130: Increase luminance of a target image based on the obtained luminance values, and use, as a photographed image of the under-display camera assembly 220, a target image obtained after the luminance is increased, where the target image is a first image photographed by one of the N1 first cameras.

N1 is less than or equal to M1, and N2 is less than or equal to M2.

In this embodiment of this application, an independent lens 407 is disposed above a photosensitive chip 408 of each camera in the under-display camera assembly 220, and may separately perform imaging. For each camera in the under-display camera assembly 220, a combination of the photosensitive chip 408 and the lens 407 in the camera can ensure that each camera has a specific light transmittance. In comparison with a case that a single camera is disposed on a display panel 210, at least one first camera and at least one second camera are disposed on the second surface 210b of the display panel 210 and at a corresponding position to the light-transmitting area 210c, thereby improving a light transmittance of the entire under-display camera assembly 220.

In this embodiment of this application, the luminance values of the at least a part of pixels in the first image collected by each first camera and the luminance values of the at least a part of pixels in the second image collected by each second camera in the under-display camera assembly 220 are used to increase the luminance of the target image, and the target image obtained after the luminance is increased is used as the photographed image of the camera assembly, so that luminance of the photographed image of the camera assembly can be greatly improved.

In some embodiments, the first camera is a color camera, and the second camera is a monochrome camera. Because the monochrome cameras may allow incident light to enter completely, and have a larger amount of light, luminance information of a second image collected by each monochrome camera and luminance information of a first image collected by each color camera in the under-display camera assembly 220 can be fused, so that luminance of a photographed image of the under-display camera assembly 220 can be greatly increased, and a clear color image with high luminance and bright colors can be obtained. Especially in a weak light environment, a clearer image with higher luminance can be obtained.

In this embodiment of this application, an image photographed by a first camera at a preset position in the N1 first cameras may be the target image. In an example, the under-display camera assembly 220 includes three color cameras and two monochrome cameras, and the five cameras are arranged in a line. Therefore, an image photographed by a color camera at a center position may be used as the target image.

In some embodiments, S120 includes S1201 to S1205.

S1201: Obtain a target photographing distance between the under-display camera assembly 220 and a target object photographed by the under-display camera assembly 220.

In this embodiment of this application, the target photographing distance is a distance between the under-display camera assembly 220 and the target object to be photographed. Because a distance between cameras in the under-display camera assembly 220 is very close, it may be considered that photographing distances of target objects to be photographed by the cameras are the same.

It should be noted that when the under-display camera assembly 220 needs to photograph the target object, the light-transmitting area 210c above the under-display camera assembly 220 needs to be off, that is, a display function is suspended.

S1203: Obtain a target area of each first image at the target photographing distance and a target area of each second image at the target photographing distance, based on a predetermined target area in an image photographed by each first camera and a predetermined target area in an image photographed by each second camera at prestored different photographing distances.

In this embodiment of this application, the under-display camera assembly 220 may be pre-calibrated, that is, calibrated objects are separately photographed by using each first camera and each second camera in the under-display camera assembly 220 at different photographing distances. At any photographing distance, for an image photographed by each first camera or second camera, a position area of a calibrated object in the image is used as a predetermined target area of the image. The calibrated object may be a target object to be photographed, or may be another object to be photographed. If the calibrated object is the target object, a predetermined target area in an image photographed by the first camera or the second camera at any prestored photographing distance is a location area in which the target object is located in the image.

In an example, the predetermined target area may be represented by using a pixel coordinate range. At any photographing distance, a quantity of pixels in a predetermined target area of an image photographed by each first camera is the same as a quantity of pixels in a predetermined target area of an image photographed by each second camera.

At a photographing distance, for each pixel in a predetermined target area of an image photographed by one first camera, the pixel corresponds to a pixel at a corresponding position and with same color information in a predetermined target area of an image photographed by another first camera, and the pixel corresponds to a pixel at a corresponding position in a predetermined target area of an image photographed by each second camera.

Figure 8:
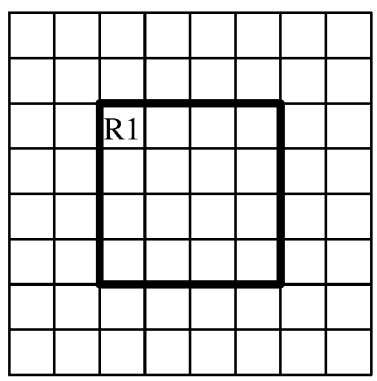
FIG. 8 is a schematic diagram of an example of a target area of a first image according to an embodiment of this application.
Figure 8:
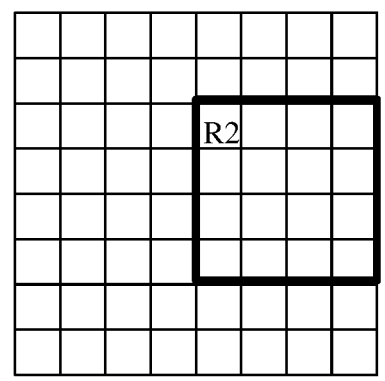
Figure 8:
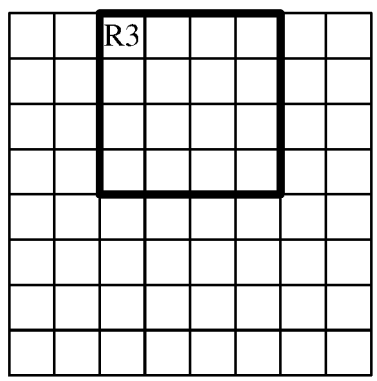
Figure 8:
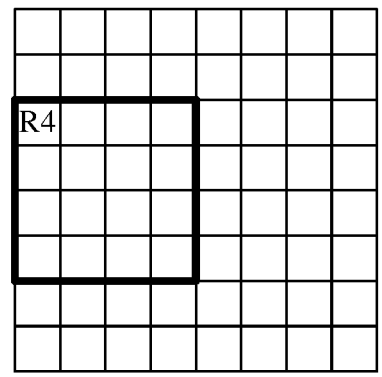

As shown in FIG. 8, in an example, the under-display camera assembly 220 includes two color cameras and two monochrome cameras. It is assumed that a size of a first image photographed by each color camera on the target object is 8 pixels×8 pixels, and a size of a first image photographed by each monochrome camera on the target object is also 8 pixels×8 pixels. An area of 4 pixels×4 pixels in a thick black frame of each of two first images in a first row in FIG. 8 is a target area corresponding to the first image. An area of 4 pixels×4 pixels in a thick black frame of each of two second images in a second row in FIG. 8 is a target area corresponding to the second image. A target area in FIG. 8 is merely a schematic diagram, and a size of an image in FIG. 8 is merely illustrated, and is not specifically limited. In some embodiments, a size of the first image may be 8 million pixels×8 million pixels.

S1205: For each target area, obtain a luminance value of each pixel in the target area.

In some embodiments of this application, the luminance value of each pixel in each target area needs to be used to increase the luminance value of the pixel in the target area of the target image. Therefore, luminance values of all pixels in each target area need to be first obtained.

After the luminance value of each pixel in the target area of each first image is obtained, step S140 includes S1401 to S1402.

S1401: Use each pixel in a target area of the target image as a first target pixel.

In this embodiment of this application, the luminance value of each pixel in the target area of the target image needs to be increased. Therefore, each pixel in the target area of the target image may be used as the first target pixel.

S1402: For each first target pixel, add a luminance value of the first target pixel and a first luminance value to obtain a first target luminance value, and increase the luminance value of the first target pixel to the first target luminance value.

The first luminance value is a sum of a luminance value of a pixel corresponding to the first target pixel in a target area of each first image other than the target image, and a luminance value of a pixel corresponding to the first target pixel in the target area of each second image.

It should be noted that each first target pixel corresponds to a pixel at a corresponding position in each target area other than the target area of the target image.

In an example, referring to FIG. 8, pixels in an $i^{th}$ row and a $j^{th}$ column in each target area are pixels at corresponding positions, and color information of pixels at corresponding positions in a target area of a first image photographed by each color camera is also the same.

Referring to FIG. 8, pixels in a first row and a first column in each target area are corresponding four pixels, and color information of pixels in a first row and a first column in target areas of first images photographed by two color cameras is red. Assuming that a first image photographed by a first color camera is a target image, a pixel in a first row and a first column of a target area in an upper left corner in FIG. 8 is a first target pixel, and it is assumed that a luminance value of the first target pixel is R1. It is assumed that a luminance value of a pixel in a first row and a first column of a target area in an upper right corner in FIG. 8 is R2, a luminance value of a pixel in a first row and a first column of a target area in a lower left corner in FIG. 8 is R3, and a luminance value of a pixel in a first row and a first column of a target area in a lower right corner in FIG. 8 is R4.

A first luminance value R'=R2+R3+R4. A total first target luminance value R corresponding to a pixel in a first row and a first column in the target area of the target image is R1+R'=R1+R2+R3+R4. Then, the luminance value of the pixel in the first row and the first column in the target area of the target image is increased to the total R.

Through the foregoing similar method, the luminance value of each pixel in the target area of the target image may be increased. Then, a target image obtained after luminance of the target area is increased is used as an image photographed by the under-display camera assembly 220 on the target object.

In this embodiment of this application, luminance values of all pixels in the target area of each first image and luminance values of all pixels in the target area of each second image are used to increase the luminance value of each pixel in the target area of the target image, so that luminance of an image photographed by the under-display camera assembly 220 is increased.

In some embodiments, luminance information of an image collected by a monochrome camera is more. Therefore, luminance information of the second image collected by the monochrome camera and luminance information of the first image collected by the color camera can be fused, so that the under-display camera assembly 220 can photograph a color image with higher luminance.

In this embodiment of this application, fields of view of all cameras in the under-display camera assembly 220 have a same overlapping area. Because fields of view of cameras in the under-display camera assembly 220 have a same overlapping area, a first image photographed by each first camera and a second image photographed by each second camera have a respective corresponding target area.

In this embodiment of this application, if a distance between cameras in the under-display camera assembly 220 is set to be closer, a quantity of pixels included in a target area of each first image and a target area of each second image is larger, so that overall luminance of an image photographed by the under-display camera assembly 220 can be further increased.

In some embodiments of this application, to reduce a luminance difference between a target area and a non-target area in an image of photographed by the under-display camera assembly 220 on the target object, in step S140, a luminance value of each pixel in the non-target area of the target image may be further obtained, and then the obtained luminance value of each pixel in the non-target area of the target image is increased by a preset multiple.

In an example, preset multiple is N1−1 times. That is, a luminance value of each pixel in a non-target area of the target image is adjusted to N1 times of an original luminance value.

In some other embodiments of this application, to improve a speed of image processing, a target area of each first image and a target area of each second image may not need to be obtained, and luminance of the target image may be directly adjusted by using luminance values of all pixels in each first image and luminance values of all pixels in each second image. Optionally, in step S120, luminance values of all pixels in the first image and luminance values of all pixels in the second image are obtained for each first image and each second image.

After the luminance values of all the pixels in each first image are obtained, step S140 includes S1401' to S1402'.

S1401': Use each pixel in the target image as a second target pixel.

S1402': For each second target pixel, add a luminance value of the second target pixel and a second luminance value to obtain a second target luminance value, and increase the luminance value of the second target pixel to the second target luminance value.

The second luminance value is a sum of a luminance value of a pixel corresponding to the second target pixel in each first image other than the target image, and a luminance value of a pixel corresponding to the second target pixel in each second image.

In some embodiments of this application, each first image and each second image have a same size, pixels in an i-th row and a j-th column of each first image and pixels in an i-th row and a j-th column of each second image are used as corresponding pixels, and color information of pixels that have a correspondence in the first image photographed by each first camera is the same.

Figure 9:
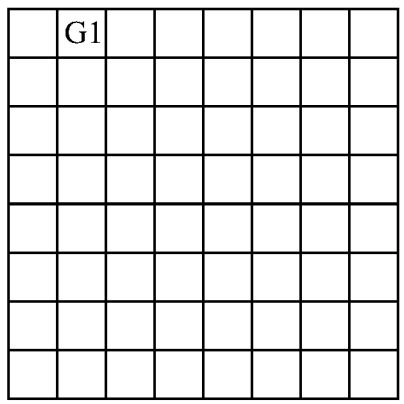
FIG. 9 is a schematic diagram of an example of a correspondence between pixels in different first images according to an embodiment of this application.
Figure 9:
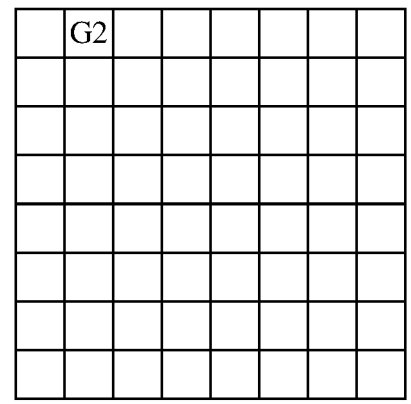
Figure 9:
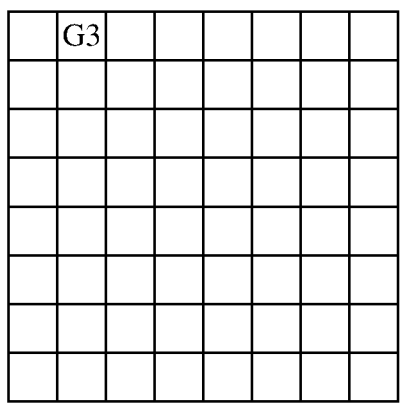
Figure 9:
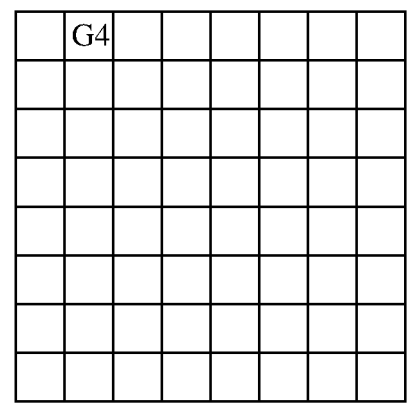

Referring to FIG. 9, pixels in a first row and a second column in each first image and pixels in a first row and a second column in each second image are corresponding four pixels, and color information of pixels in a first row and a second column of in target areas of first images photographed by two color cameras is green. It is assumed that a luminance value of a pixel in a first row and a second column of a first image in an upper left corner in FIG. 9 is G1, a luminance value of a pixel in a first row and a second column of a first image in an upper right corner in FIG. 9 is G2, a luminance value of a pixel in a first row and a second column of a second image in a lower left corner in FIG. 9 is G3, and a luminance value of a pixel in a first row and a second column of a second image in a lower right corner in FIG. 9 is G4.

A second luminance value G'=G2+G3+G4. A total second target luminance value G corresponding to a pixel in a first row and a first column of the target image is G1+G'=G1+G2+G3+G4. Then, the luminance value of the pixel in the first row and the second column of the target image is increased to the total G.

Through the foregoing similar method, the luminance value of each pixel in the target image may be adjusted. Then, a target image obtained after luminance is adjusted for each pixel is used as an image photographed by the under-display camera assembly 220 on the target object.

That is, if a distance between cameras of the under-display camera assembly 220 is very close, a difference between first images may be ignored, and the target area may be not pre-calibrated. Luminance of the target image may be directly increased by using all pixels in each first image and all pixels in each second image, so that a speed of image processing is improved while luminance of an image photographed by the under-display camera assembly 220 is increased.

Figure 10:
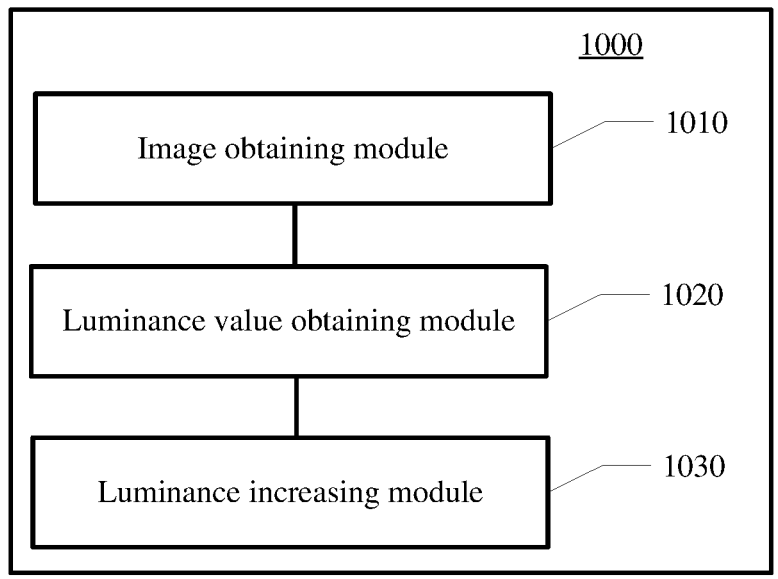
FIG. 10 is a schematic structural diagram of an embodiment of the image processing apparatus provided in the second aspect of this application.

FIG. 10 is a schematic structural diagram of an embodiment of an image processing apparatus applied to the foregoing electronic device provided in the second aspect of this application. An image processing apparatus 1000 provided in this embodiment of this application includes:

an image obtaining module 1010, configured to obtain a first image photographed by each of N1 first cameras in the M1 first cameras and a second image photographed by each of N2 second cameras in the M2 second cameras;

a luminance value obtaining module 1020, configured to obtain luminance values of at least a part of pixels in the first image and luminance values of at least a part of pixels in the second image for each first image and each second image; and a luminance increasing module 1030, configured to increase luminance of a target image based on the obtained luminance values, and using, as a photographed image of the under-display camera assembly, a target image obtained after the luminance is increased, where the target image is a first image photographed by one of the N1 first cameras.

In this embodiment of this application, the luminance values of the at least a part of pixels in the first image collected by each first camera and the luminance values of the at least a part of pixels in the second image collected by each second camera in the under-display camera assembly 220 are used to increase the luminance of the target image, and the target image obtained after the luminance is increased is used as the photographed image of the camera assembly, so that luminance of the photographed image of the camera assembly can be greatly improved.

In this embodiment of this application, the luminance value obtaining module 1020 includes:

a target photographing distance obtaining unit, configured to obtain a target photographing distance between the under-display camera assembly 220 and a target object photographed by the under-display camera assembly 220;

a target area determining unit, configured to obtain a target area of each first image at the target photographing distance and a target area of each second image at the target photographing distance, based on a predetermined target area in an image photographed by each first camera and a predetermined target area in an image photographed by each second camera at prestored different photographing distances; and a first luminance value obtaining unit, configured to: for each target area obtain a luminance value of each pixel in the target area.

In this embodiment of this application, a predetermined target area in an image photographed by the first camera or the second camera at any prestored photographing distance is a position area in which the target object is located in the image.

In this embodiment of this application, the luminance increasing module 1030 is configured to:

use each pixel in a target area of the target image as a first target pixel; and for each first target pixel, add a luminance value of the first target pixel and a first luminance value to obtain a first target luminance value, and increase the luminance value of the first target pixel to the first target luminance value, where the first luminance value is a sum of a luminance value of a pixel corresponding to the first target pixel in a target area of each first image other than the target image, and a luminance value of a pixel corresponding to the first target pixel in the target area of each second image.

In this embodiment of this application, the luminance increasing module 1030 is further configured to:

increase an obtained luminance value of each pixel in a non-target area of the target image by a preset multiple, where the preset multiple is N1−1 times.

In this embodiment of this application, the luminance value obtaining module 1020 is configured to:

obtain luminance values of all pixels in the first image and luminance values of all pixels in the second image for each first image and each second image.

In this embodiment of this application, the luminance increasing module 1030 is further configured to:

use each pixel in the target image as a second target pixel; and for each second target pixel, add a luminance value of the second target pixel and a second luminance value to obtain a second target luminance value, and increase the luminance value of the second target pixel to the second target luminance value, where the second luminance value is a sum of a luminance value of a pixel corresponding to the second target pixel in each first image other than the target image, and a luminance value of a pixel corresponding to the second target pixel in each second image.

A third aspect of this application further provides an electronic device, including:

an under-display camera assembly, where the under-display camera assembly includes M1 first cameras and M2 second cameras; and an image processing apparatus, configured to: obtain a first image photographed by each of N1 first cameras in the M1 first cameras and a second image photographed by each of N2 second cameras in the M2 second cameras; obtain luminance values of at least a part of pixels in the first image and luminance values of at least a part of pixels in the second image for each first image and each second image; and increase luminance of a target image based on the obtained luminance values, and use, as a photographed image of the under-display camera assembly, a target image obtained after the luminance is increased, where the target image is a first image photographed by one of the N1 first cameras, where M1, N1, M2, and N2 are all integers greater than or equal to 1, N1 is less than or equal to M1, and N2 is less than or equal to M2.

The electronic device provided in this embodiment of this application may include the display panel 210 in FIG. 2. In the electronic device according to this embodiment, the under-display camera assembly may be the under-display camera assembly 220 described above with reference to FIG. 2 and any example thereof. The image processing apparatus may be the image processing apparatus 1000 described with reference to FIG. 10 and any example thereof.

A fourth aspect of this application further provides an electronic device, and the electronic device includes:

a memory, configured to store a program; and a processor, configured to run the program stored in the memory to perform the steps in the image processing method in the embodiments of this application, where the method includes: obtaining a first image photographed by each of N1 first cameras in the M1 first cameras and a second image photographed by each of N2 second cameras in the M2 second cameras; obtaining luminance values of at least a part of pixels in the first image and luminance values of at least a part of pixels in the second image for each first image and each second image; and increasing luminance of a target image based on the obtained luminance values, and using, as a photographed image of the under-display camera assembly 220, a target image obtained after the luminance is increased, where the target image is a first image photographed by one of the N1 first cameras.

The electronic device provided in this application can implement the processes in any one of the foregoing embodiments of the image processing method according to the first aspect of this application. To avoid repetition, details are not described herein again. In this embodiment, the luminance values of the at least a part of pixels in the first image collected by each first camera and the luminance values of the at least a part of pixels in the second image collected by each second camera in the under-display camera assembly 220 are used to increase the luminance of the target image, and the target image obtained after the luminance is increased is used as the photographed image of the camera assembly, so that luminance of the photographed image of the camera assembly can be greatly improved.

Figure 11:
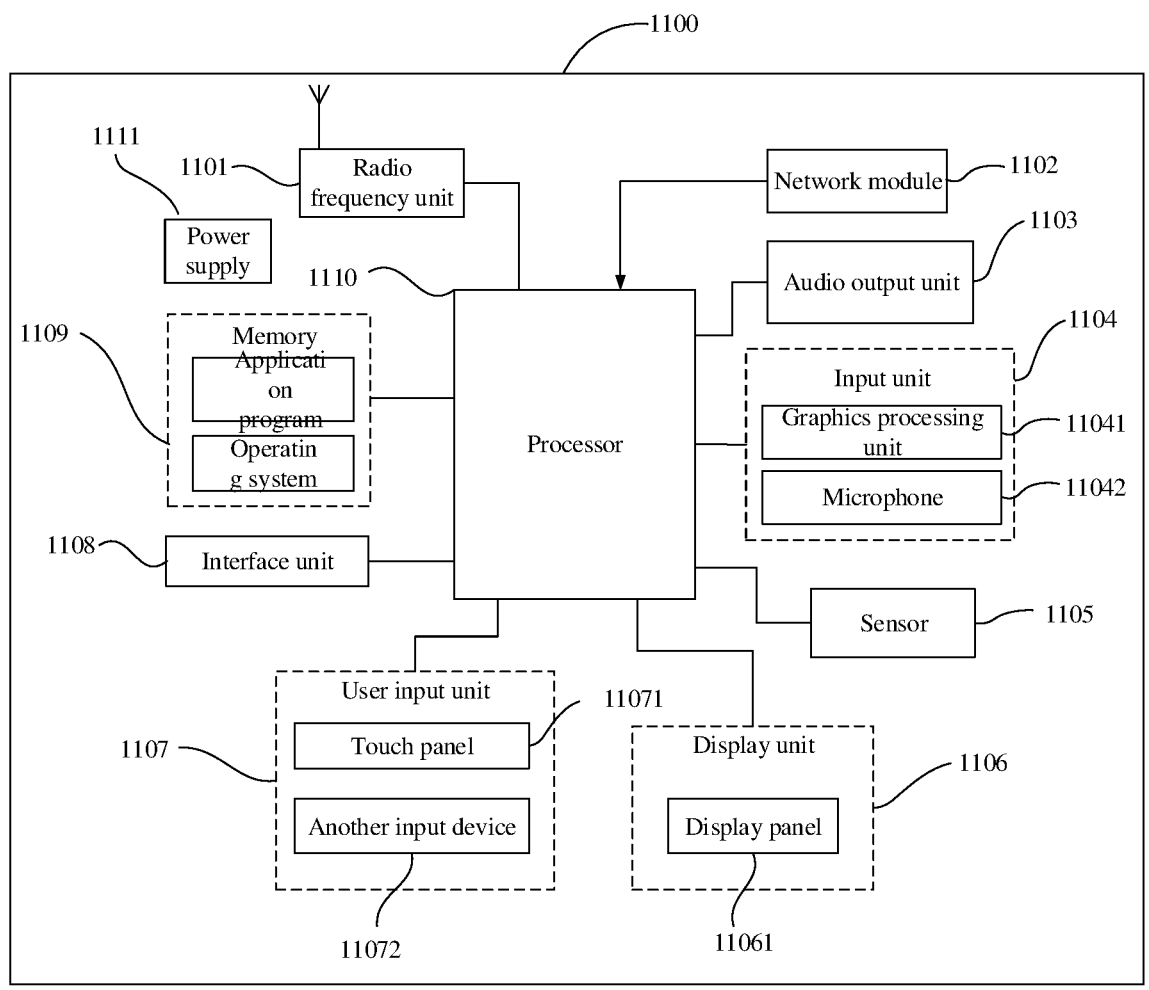
FIG. 11 is a schematic structural diagram of an embodiment of an electronic device according to this application.

FIG. 11 is a schematic structural diagram of an embodiment of the electronic device provided in the fourth aspect of this application. An electronic device 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, a processor 1110, and a power supply 1111. The electronic device 1100 further includes a first screen and a second screen. A person skilled in the art may understand that a structure of the electronic device shown in FIG. 11 constitutes no limitation on the electronic device, and the electronic device may include more or fewer components than those shown in the figure, or have a combination of some components, or have a different component arrangement. In this embodiment of this application, the electronic device includes but is not limited to a mobile phone, a tablet computer, a notebook computer, a palmtop computer, an in-vehicle terminal, a wearable device, a pedometer, and the like.

The processor 1110 is configured to: obtain a first image photographed by each of N1 first cameras in the M1 first cameras and a second image photographed by each of N2 second cameras in the M2 second cameras; obtain luminance values of at least a part of pixels in the first image and luminance values of at least a part of pixels in the second image for each first image and each second image; and increase luminance of a target image based on the obtained luminance values, and use, as a photographed image of the under-display camera assembly 220, a target image obtained after the luminance is increased, where the target image is a first image photographed by one of the N1 first cameras.

In this embodiment of this application, the luminance values of the at least a part of pixels in the first image collected by each first camera and the luminance values of the at least a part of pixels in the second image collected by each second camera in the under-display camera assembly 220 are used to increase the luminance of the target image, and the target image obtained after the luminance is increased is used as the photographed image of the camera assembly, so that luminance of the photographed image of the camera assembly can be greatly improved.

It should be understood that, in this embodiment of this application, the radio frequency unit 1101 may be configured to receive and send information or a signal in a call process. For example, after receiving downlink data from a base station, the radio frequency unit 1101 sends the downlink data to the processor 1110 for processing. In addition, the radio frequency unit 1101 sends uplink data to the base station. Usually, the radio frequency unit 1101 includes but is not limited to an antenna, at least one amplifier, a transceiver, a coupler, a low noise amplifier, a duplexer, and the like. In addition, the radio frequency unit 1101 may communicate with a network and another device through a wireless communication system.

The electronic device provides wireless broadband Internet access for the user by using the network module 1102, for example, helping the user to send and receive an e-mail, brows a web page, and access streaming media.

The audio output unit 1103 may convert audio data received by the radio frequency unit 1101 or the network module 1102 or stored in the memory 1109 into an audio signal and output the audio signal as a sound. In addition, the audio output unit 1103 may further provide an audio output (for example, a call signal received voice, or a message received voice) related to a specific function implemented by the electronic device 1100. The audio output unit 1103 includes a speaker, a buzzer, a telephone receiver, and the like.

The input unit 1104 is configured to receive an audio signal or a video signal. The input unit 1104 may include a graphics processing unit (GPU) 11041 and a microphone 11042, and the graphics processing unit 11041 processes image data of a still picture or video obtained by an image capture apparatus (such as a camera) in a video capture mode or an image capture mode. A processed image frame may be displayed on the display unit 1106. The image frame processed by the graphics processor 11041 may be stored in the memory 1109 (or another storage medium) or sent by using the radio frequency unit 1101 or the network module 1102. The microphone 11042 may receive a sound and can process such sound into audio data. Processed audio data may be converted, in a call mode, into a format that can be sent to a mobile communication base station by using the radio frequency unit 1101 for output.

The electronic device 1100 further includes at least one sensor 1105 such as a light sensor, a motion sensor, and another sensor. The light sensor includes an ambient light sensor and a proximity sensor. The ambient light sensor may adjust luminance of the display panel 11061 based on luminance of ambient light. The proximity sensor may turn off the display panel 11061 and/or backlight when the electronic device 1100 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the electronic device (such as screen switching between landscape and portrait modes, a related game, or magnetometer posture calibration), a function related to vibration recognition (such as a pedometer or a knock), and the like. The sensor 1105 may further include a fingerprint sensor, a pressure sensor, an iris sensor, a molecular sensor, a gyroscope, a barometer, a hygrometer, a thermometer, an infrared sensor, and the like. Details are not described herein.

The display unit 1106 is configured to display information entered by a user or information provided for a user. The display unit 1106 may include a display panel 11061. The display panel 11061 may be configured in a form of a liquid crystal display (LCD), an organic light-emitting diode (OLED), or the like.

The user input unit 1107 may be configured to: receive entered digital or character information, and generate key signal input related to a user setting and function control of the electronic device. The user input unit 1107 includes a touch panel 11071 and another input device 11072. The touch panel 11071 is also referred to as a touchscreen, and may collect a touch operation performed by a user on or near the touch panel 11071 (such as an operation performed by a user on the touch panel 11071 or near the touch panel 11071 by using any proper object or accessory, such as a finger or a stylus). The touch panel 11071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 1110, and can receive and execute a command sent by the processor 1110. In addition, the touch panel 11071 may be of a resistive type, a capacitive type, an infrared type, a surface acoustic wave type, or the like. The user input unit 1107 may include another input device 11072 in addition to the touch panel 11071. The another input device 11072 may include but is not limited to a physical keyboard, a functional button (such as a volume control button or a power on/off button), a trackball, a mouse, and a joystick. Details are not described herein.

Optionally, the touch panel 11071 may cover the display panel 11061. When detecting the touch operation on or near the touch panel 11071, the touch panel 11071 transmits the touch operation to the processor 1110 to determine a type of a touch event, and then the processor 1110 provides corresponding visual output on the display panel 11061 based on the type of the touch event. In FIG. 11, although the touch panel 11071 and the display panel 11061 are used as two independent parts to implement input and output functions of the electronic device, in some embodiments, the touch panel 11071 and the display panel 11061 may be integrated to implement the input and output functions of the electronic device. This is not specifically limited herein.

The interface unit 1108 is an interface for connecting an external apparatus with the electronic device 1100. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 1108 may be configured to receive input (for example, data information and power) from an external apparatus and transmit the received input to one or more elements in the electronic device 1100 or may be configured to transmit data between the electronic device 1100 and an external apparatus.

The memory 1109 may be configured to store a software program and various data. The memory 1109 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 1109 may include a high-speed random access memory, and may further include a nonvolatile memory, for example, at least one magnetic disk storage device, a flash storage device, or another volatile solid-state storage device.

The processor 1110 is a control center of the electronic device, connects all parts of the entire electronic device by using various interfaces and lines, and performs various functions of the electronic device and data processing by running or executing a software program and/or a module that are/is stored in the memory 1109 and by invoking data stored in the memory 1109, to overall monitor the electronic device. Optionally, the processor 1110 may include one or more processing units. An application processor and a modem processor may be integrated into the processor 1110. The application processor mainly processes an operating system, a user interface, an application program, and the like. The modem processor mainly processes wireless communications. It can be understood that, alternatively, the modem processor may not be integrated into the processor 1110.

The electronic device 1100 may further include the power supply 1111 (such as a battery) that supplies power to each component. The power supply 1111 may be logically connected to the processor 1110 by using a power supply management system, so as to implement functions such as charging management, discharging management, and power consumption management by using the power supply management system.

In addition, the electronic device 1100 includes some function modules not shown, and details are not described herein.

A fifth aspect of this application further provides a non-transitory computer-readable storage medium. The non-transitory computer-readable storage medium stores a computer program, and when the computer program is executed by a processor, the processes of any embodiment of the image processing method in the first aspect of this application are implemented and a same technical effect can be achieved. To avoid repetition, details are not described herein again. An example of the non-transitory computer-readable storage medium may include a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

The foregoing describes the aspects of the present disclosure with reference to flowcharts and/or block diagrams of the method, the apparatus (system), or the computer program product according to the embodiments of the present disclosure. It should be understood that each block in the flowchart and/or block diagram and a combination of blocks in the flowchart and/or block diagram may be implemented by computer program instructions. These computer program instructions may be provided for a general-purpose computer, a dedicated computer, or a processor of another programmable data processing apparatus to generate a machine, so that when these instructions are executed by the computer or the processor of the another programmable data processing apparatus, specific functions/actions in one or more blocks in the flowcharts and/or in the block diagrams are implemented. The processor may be but is not limited to a general-purpose processor, a dedicated processor, a special application processor, or a field programmable logic array. It should also be understood that each block in the block diagram or the flowchart and a combination of blocks in the block diagram or the flowchart may be implemented by using a dedicated hardware-based system that performs a specified function or operation, or may be implemented by using a combination of dedicated hardware and a computer instruction.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. An image processing method, applied to an electronic device, wherein the electronic device comprises an under-display camera assembly, the under-display camera assembly comprises M1 first cameras and M2 second cameras, and the method comprises:
    obtaining a first image photographed by each of N1 first cameras in the M1 first cameras and a second image photographed by each of N2 second cameras in the M2 second cameras;
    obtaining luminance values of at least a part of pixels in the first image and luminance values of at least a part of pixels in the second image for each first image and each second image; and
    increasing luminance of a target image based on obtained luminance values, and using, as a photographed image of the under-display camera assembly, the target image obtained after the luminance is increased, wherein the target image is a first image photographed by one of the N1 first cameras, wherein
    M1, N1, M2, and N2 are all integers greater than or equal to 1, N1 is less than or equal to M1, and N2 is less than or equal to M2;
    wherein the obtaining luminance values of at least a part of pixels in the first image and luminance values of at least a part of pixels in the second image for each first image and each second image comprises:
    obtaining a target photographing distance between the under-display camera assembly and a target object photographed by the under-display camera assembly;
    obtaining a target area of each first image at the target photographing distance and a target area of each second image at the target photographing distance, based on a predetermined target area in an image photographed by each first camera and a predetermined target area in an image photographed by each second camera at prestored different photographing distances; and
    for each target area, obtaining a luminance value of each pixel in the target area,
    wherein the increasing luminance of a target image based on obtained luminance values comprises:
    using each pixel in a target area of the target image as a first target pixel; and
    for each first target pixel, adding a luminance value of the first target pixel and a first luminance value to obtain a first target luminance value, and increasing the luminance value of the first target pixel to the first target luminance value, and
    wherein the first luminance value is a sum of a luminance value of a pixel corresponding to the first target pixel in a target area of each first image other than the target image, and a luminance value of a pixel corresponding to the first target pixel in the target area of each second image.

2. The method according to claim 1, wherein the first camera is a color camera, and the second camera is a monochrome camera.

3. The method according to claim 1, wherein a predetermined target area in an image photographed by the first camera or the second camera at any prestored photographing distance is a position area in which the target object is located in the image.

4. The method according to claim 1, wherein the increasing luminance of a target image based on obtained luminance values further comprises:
    increasing an obtained luminance value of each pixel in a non-target area of the target image by a preset multiple, wherein the preset multiple is N1−1 times.

5. The method according to claim 1, wherein the obtaining luminance values of at least a part of pixels in the first image and luminance values of at least a part of pixels in the second image for each first image and each second image comprises:

obtaining luminance values of all pixels in the first image and luminance values of all pixels in the second image for each first image and each second image.

6. The method according to claim 5, wherein the increasing luminance of a target image based on obtained luminance values comprises:

using each pixel in the target image as a second target pixel; and for each second target pixel, adding a luminance value of the second target pixel and a second luminance value to obtain a second target luminance value, and increasing the luminance value of the second target pixel to the second target luminance value, wherein the second luminance value is a sum of a luminance value of a pixel corresponding to the second target pixel in each first image other than the target image, and a luminance value of a pixel corresponding to the second target pixel in each second image.

7. An electronic device, comprising:

an under-display camera assembly, wherein the under-display camera assembly comprises M1 first cameras and M2 second cameras; and an image processing apparatus, configured to: obtain a first image photographed by each of N1 first cameras in the M1 first cameras and a second image photographed by each of N2 second cameras in the M2 second cameras; obtain luminance values of at least a part of pixels in the first image and luminance values of at least a part of pixels in the second image for each first image and each second image; and increase luminance of a target image based on obtained luminance values, and use, as a photographed image of the under-display camera assembly, the target image obtained after the luminance is increased, wherein the target image is a first image photographed by one of the N1 first cameras; and M1, N1, M2, and N2 are all integers greater than or equal to 1, N1 is less than or equal to M1, and N2 is less than or equal to M2;

wherein the image processing apparatus is configured to: obtain a target photographing distance between the under-display camera assembly and a target object photographed by the under-display camera assembly; obtain a target area of each first image at the target photographing distance and a target area of each second image at the target photographing distance, based on a predetermined target area in an image photographed by each first camera and a predetermined target area in an image photographed by each second camera at pre-stored different photographing distances; and for each target area, obtain a luminance value of each pixel in the target area;

wherein the image processing apparatus is configured to: use each pixel in a target area of the target image as a first target pixel; and for each first target pixel, add a luminance value of the first target pixel and a first luminance value to obtain a first target luminance value, and increase the luminance value of the first target pixel to the first target luminance value, wherein the first luminance value is a sum of a luminance value of a pixel corresponding to the first target pixel in a target area of each first image other than the target image, and a luminance value of a pixel corresponding to the first target pixel in the target area of each second image.

8. The electronic device according to claim 7, wherein the first camera is a color camera, and the second camera is a monochrome camera.

9. The electronic device according to claim 7, wherein fields of view of all cameras in the under-display camera assembly have a same overlapping area.

10. The electronic device according to claim 7, wherein the M1 first cameras and the M2 second cameras are arranged in arrays.

11. The electronic device according to claim 7, wherein the first camera comprises a lens, a lens holder, a filter assembly, a photosensitive chip, and a circuit board connected to the photosensitive chip; and the lens holder is disposed on the circuit board, the lens and the filter assembly are disposed on the lens holder, and the filter assembly is located between the lens and the photosensitive chip.

12. An electronic device, comprising a processor and a memory that stores a computer program instruction, wherein the electronic device comprises an under-display camera assembly, the under-display camera assembly comprises M1 first cameras and M2 second cameras; and the computer program instruction, when executed by the processor, causes the electronic device to perform:

obtaining a first image photographed by each of N1 first cameras in the M1 first cameras and a second image photographed by each of N2 second cameras in the M2 second cameras;

obtaining luminance values of at least a part of pixels in the first image and luminance values of at least a part of pixels in the second image for each first image and each second image; and increasing luminance of a target image based on obtained luminance values, and using, as a photographed image of the under-display camera assembly, the target image obtained after the luminance is increased, wherein the target image is a first image photographed by one of the N1 first cameras, wherein M1, N1, M2, and N2 are all integers greater than or equal to 1, N1 is less than or equal to M1, and N2 is less than or equal to M2;

wherein the computer program instruction, when executed by the processor, causes the electronic device to perform:

obtaining a target photographing distance between the under-display camera assembly and a target object photographed by the under-display camera assembly;

obtaining a target area of each first image at the target photographing distance and a target area of each second image at the target photographing distance, based on a predetermined target area in an image photographed by each first camera and a predetermined target area in an image photographed by each second camera at pre-stored different photographing distances; and for each target area, obtaining a luminance value of each pixel in the target area;

wherein the computer program instruction, when executed by the processor, causes the electronic device to perform:

using each pixel in a target area of the target image as a first target pixel; and for each first target pixel, adding a luminance value of the first target pixel and a first luminance value to obtain a first target luminance value, and increasing the luminance value of the first target pixel to the first target luminance value, and wherein the first luminance value is a sum of a luminance value of a pixel corresponding to the first target pixel in a target area of each first image other than the target image, and a luminance value of a pixel corresponding to the first target pixel in the target area of each second image.

13. The electronic device according to claim 12, wherein a predetermined target area in an image photographed by the first camera or the second camera at any prestored photographing distance is a position area in which the target object is located in the image.

14. The electronic device according to claim 12, wherein the computer program instruction, when executed by the processor, causes the electronic device to further perform:

increasing an obtained luminance value of each pixel in a non-target area of the target image by a preset multiple, wherein the preset multiple is N1-1 times.

15. The electronic device according to claim 12, wherein the computer program instruction, when executed by the processor, causes the electronic device to perform:

obtaining luminance values of all pixels in the first image and luminance values of all pixels in the second image for each first image and each second image.

16. The electronic device according to claim 15, wherein the computer program instruction, when executed by the processor, causes the electronic device to perform:

using each pixel in the target image as a second target pixel; and for each second target pixel, adding a luminance value of the second target pixel and a second luminance value to obtain a second target luminance value, and increasing the luminance value of the second target pixel to the second target luminance value, wherein the second luminance value is a sum of a luminance value of a pixel corresponding to the second target pixel in each first image other than the target image, and a luminance value of a pixel corresponding to the second target pixel in each second image.

* * * * *